Dec. 7, 1965  B. D. BROWN  3,222,552
INTEGRATOR MODULATOR
Filed Nov. 14, 1961
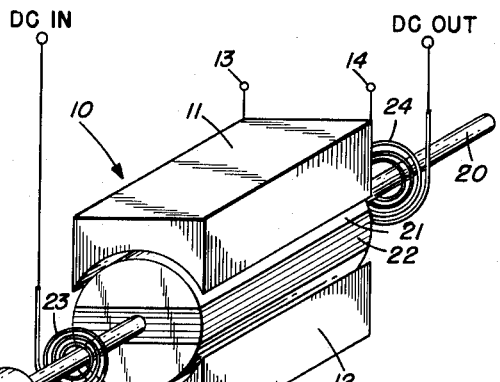
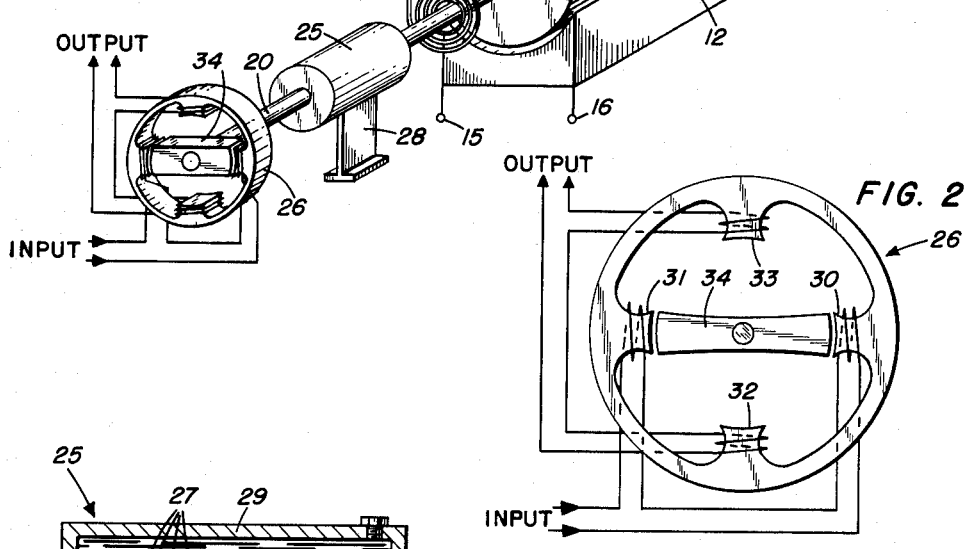
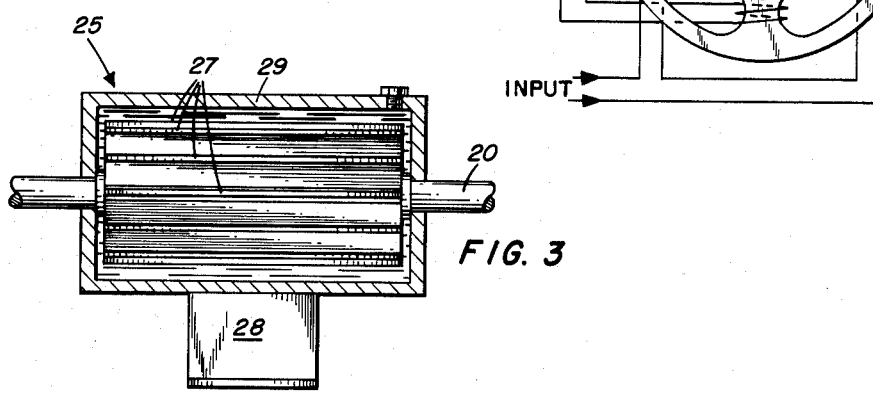
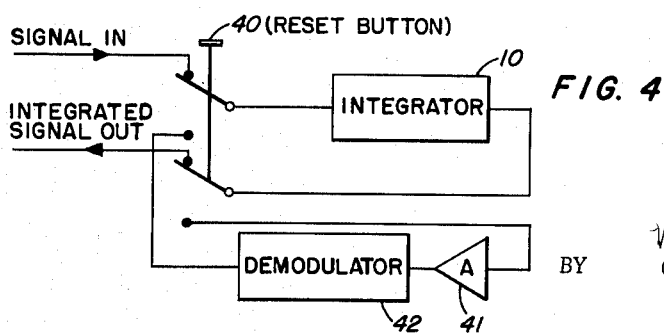
INVENTOR
BARRY D. BROWN
BY
ATTORNEYS United States Patent Office 3,222,552
Patented Dec. 7, 1965

3,222,552
INTEGRATOR MODULATOR
Barry David Brown, Englewood, N.J., assignor, by mesne assignments, to the United States of America as represented by the Secretary of the Navy
Filed Nov. 14, 1961, Ser. No. 152,366
1 Claim. (Cl. 307—106)

The present invention relates to an integrator, and more specifically, to the use of a damped D'Arsonval movement as an integrator.

High performance servo systems, particularly those employed for missile and aircraft stabilization, make use of one or more integrations of the error of the system. Attitude, air speed, altitude, angular acceleration, and forward and sideward acceleration are areas of possible missile deviations from desired conditions which must be detected and corrected. In the past it has been necessary to accomplish the electrical integration by the use of a passive resistance-capacitance network, a "Miller" integrator, or by a mechanical filter.

The use of a passive resistance-capacitance network offers the disadvantage that for substantial accuracy the attenuation of the unit must be made very large. In the simple resistance-capacitance circuit large values of the time constant, which are desirable for good integration, can be obtained only at the expense of large resistance and capacitance values and of low gains. Further, the effect of connecting a load to the integrator causes a decrease in the time constant and therefore diminishes the accuracy of integration.

More satisfactory integration is possible by the use of a high gain amplifier with a capacitor forming a feedback path for output variations. This integration is normally entitled a "Miller" integrator. The amplifier produces an output which is not limited by the input signal and supplies the energy that is required in the output. While the "Miller" integrator finds frequent use, it requires a drift-free D.C. amplifier. The design and maintenance problems of a drift-free amplifier are such as to be highly disadvantageous.

Integration may also be accomplished by a mechanical filter comprised of a highly damped D.C. or A.C. motor with a vane take-off to provide an A.C. integrated output for an A.C. or D.C. input signal. In addition to the disadvantages that such an integrator is expensive and difficult to manufacture, an A.C. or D.C. motor power amplifier is required so that the signal will be strong enough to drive the motor at varying speeds.

The instant invention pertains to the use of a highly damped D'Arsonval movement and a microsyn pickoff. The damping force is held at a level which is much greater than the mass of the moving coil or the return spring force. Thus, the displacement angle of the coil shaft from the zero reference is equal to some constant times the integral of the applied current to the coil.

The instant invention is capable of achieving drift-free integration and will accomplish a convention power gain without the use of any active components such as electron tubes or transistors. The novel integrator is also rugged, inexpensive to manufacture, and has an extremely long life. The output of the unit being a pure sinusoidal A.C. output voltage at carrier frequency makes the use of carrier-type high-performance servo systems practical. The invention embraces the advantages of prior integrators and possesses none of the aforedescribed disadvantages.

An object of the present invention is the provision of a drift-free integrator.

Another object is to provide an integrator capable of providing a conversion power gain without the use of any active components such as electron tubes or transistors.

A further object of the invention resides in the provision of a rugged integrator having a long life and being inexpensive to manufacture.

Still another object is to provide an integrator capable of practical use with carrier-type high-performance servo systems.

Other objects and many of the attendant advantages of this invention will be readily appreciated as the same becomes better understood by reference to the following detailed descriptions when considered in connection with the accompanying drawings wherein:

FIG. 1 illustrates in perspective the damped D'Arsonval movement integrator and microsyn pickoff;

FIG. 2 illustrates an end view of the microsyn pickoff;

FIG. 3 illustrates in section a side view of the silicone damper;

FIG. 4 sets forth the schematic diagram of an integrator reset circuit.

Referring now to the drawings wherein the reference characters designate like or corresponding parts throughout the several views, there is shown in FIG. 1 an integrator unit 10 comprised of magnetic coils 11 and 12. Magnetic coils 11 and 12 have appropriate electrical connections 13 and 14, and 15 and 16, respectively. The permanent magnetic coils may alternatively be the north and south poles of a magnet and obtain the same results as electromagnetic coils 11 and 12. Between the magnetic coils 11 and 12 is maintained a rotatable core 21 upon which is wound a coil 22. The core 21 and coil 22 are mounted on a rotatable shaft 20. Also mounted on the rotatable shaft 20 are springs 23 and 24 which are respectively mounted fore and aft of the rotatable core 21. Springs 23 and 24 are respectively attached to a D.C. input and D.C. output and complete their electrical connection through coil 22. The springs 23 and 24 also provide the return spring force to the shaft upon its rotation. At the outer extremity of the rotatable shaft 20 is maintained an A.C. pickoff known as a microsyn 26. The rotor 34 of the microsyn 26 is attached to the rotatable shaft 20 for rotation within the microsyn housing so as to vary the output of the microsyn 26. Attached between the spring 23 and the microsyn 26 is a silicone oil container 25. Within the silicone oil container 25 are maintained vanes 27 which are attached to the rotating shaft 20 and immersed in silicone oil. The damping force of the silicone oil is maintained so as to be much greater than the mass of the moving oil or the return spring force. Thus, the D.C. current flowing through coil 22 sets up a field that interacts with the field set up by the magnetic coils 11 and 12 to cause rotation of the rotatable shaft 20 and the displacement angle of the coil shaft from the zero reference will be equal to some constant times the interval of applied current to coil 22.

The microsyn pickoff as best seen in FIG. 2 maintains an input reference voltage to the windings about poles 30 and 31 so as to magnetize the iron rotor 34 which is connected to the rotatable shaft 20. The magnetic field of the iron rotor 34 then induces voltage in the output windings about the poles 32 and 33 unless the rotor is in its zero position. As the rotor 34 is rotated by the rotatable shaft 20, the voltage induced in the output windings will be proportional to the displacement of the rotor. The silicone oil damping container 25, as best seen in FIG. 3, maintains an outer shell 29 through which the rotatable shaft 20 is extended. The damping container shell or housing 29 is maintained in a fixed position by a mount 28. Connected to the rotatable shaft 20 and within the damping container shell 29 are a plurality of vanes 27 which are immersed in silicone oil contained within the shell 29 thereby causing the damping of the rotating shaft 20.

FIG. 4 sets forth a simple integrator reset circuit so as to reset integrator 10 to a zero or initial condition. The circuit simply sets forth a reset button 40 which switches the integrator to a zero command circuit comprised of an amplifier 41 and a demodulator 42 thereby to the zero reference and the rotor 34 of the microsyn pickoff to its zero position between poles 30 and 31.

It should be understood that in the operation of the integrator 10 the D.C. input and output could be connected directly to coil 22 and the springs 23 and 24 eliminated. With the elimination of the springs 23 and 24, which would most likely, however, be employed for most practical integrators, the integrator would provide a perfect drift-free integration.

With the integrator 10 it is possible to integrate and thus solve:

$$(1) \quad K\int_{t_1}^{t_2} f(t)\,dt$$

$$(2) \quad Kf(y)\int_{t_1}^{t_2} f(t)\,dt$$

For a simple mathematical analysis of the integrator let:

$M$=total mass of coil, pickoff,
$\theta$=angular displacement of shaft,
$K_2$=spring restoring force constant,
$F$=damping constant due to silicone oil,
$T$=applied mechanical torque from current through moving coil.
$I$=current moving through the coil,
$C$=bearing friction, and
$K_1$=constant relating mechanical applied torque to current through moving coil.

Then:

$$(3) \quad T = K_1 I dc$$

and the differential equation for the system is:

$$(4) \quad K_1 I dc = M\frac{d^2\theta}{dt^2} + f\frac{d\theta}{dt} + K_2\theta + C$$

Since we can safely assume for the moving coil integrator that $$(5) \quad C = o$$

$$(6) \quad M\frac{d^2\theta}{dt^2} \ll$$

Equation 4 supra would be $$(7) \quad K_1 I dc = F\frac{d\theta}{dt} + K_2\theta$$

Transforming by the Laplacian transform $$(8) \quad K_1 I dc = F_s\theta(s) + K_2\theta(s)$$

and rearranging Equation 8 we obtain $$(9) \quad \frac{\theta(s)}{Idc} = \frac{K_1}{F\left(s + \frac{K_2}{F}\right)}$$

which is the transform of an exponential rise with time.

In order to accomplish a perfect integrator the transform must be of the form:

$$\frac{\text{constant.}}{S}$$

There are several procedures whereby the Equation 9 transform can be of the form of a $$\frac{\text{constant}}{S}$$

and which are susceptible of implementation with the integrator 10. First, in order to accomplish this transform, one may raise F and keep $K_2$ constant. This procedure would be the most satisfactory for a small integrator that is to be used in a missile application thus affording the most rugged unit consistent with reasonable output and integrating time. The second procedure for achieving a transform, of the form $$\frac{\text{constant}}{S}$$

would be to keep F constant and reduce $K_2$. This procedure has as one of its most promising advantages the economic factor of being inexpensive. This second procedure would offer ease of handling of the lower viscosity silicone damping fluids. The third procedure to achieve the transform desired would be to simply make $K_2$ equal to zero and keep F constant. This procedure would approach, as set forth above, wherein the use of springs 23 and 24 are eliminated, the most closely ideal integrator. The unit will perfectly integrate an input signal until the total value of its integral exceeds the maximum allowable angular displacement of the unit. Where scaling voltages are reasonable, this unit could integrate a single function for several hours with a negligible degree of error and no drift whatsoever.

Obviously, many modifications and variations of the present invention are possible in light of the above teachings. It is, therefore, to be understood that within the scope of the appended claim the invention may be practiced otherwise than is specifically described.

What is claimed and desired to be secured by Letters Patent of the United States is:

An integrator comprising the combination of a rotatable shaft; a pair of magnetic coils disposed about said shaft; a cylindrical core mounted on said shaft between said pair of coils; a third coil wound on said core so that a portion of said third coil lies parallel to said shaft, to said pair of magnetic coils, and to the longitudinal axis of said cylindrical core; first and second spring means electrically connected to said third coil and mounted on said rotatable shaft at opposite ends of said cylindrical core; electrical inputs and outputs connected respectively to said first and second spring means; an A.C. pickoff mounted at an extremity of said rotatable shaft comprising a circular iron core having four poles spaced 90° apart, input reference windings wound on two opposite poles, output windings wound on the other two opposite poles and a magnetizable rotor connected to said rotatable shaft for rotation between said four poles; and a silicone oil damper mounted on said rotatable shaft between said pickoff and one of said spring means comprising a fixed housing mounted about said rotatable shaft, silicone oil in said housing, and vanes mounted on rotatable shaft for rotation through said silicone oil whereby rotation of said third coil caused by the interaction of the fields of said pair of magnetic coils and said third coil is damped by a damping force greater than the mass of said third coil and the return force of said spring means and is equal to a constant times the integral of the current applied to said third coil.

References Cited by the Examiner

UNITED STATES PATENTS

| | | | |
|---|---|---|---|
| 1,515,634 | 11/1924 | Vawter | 324—125 |
| 1,558,353 | 10/1925 | Hadley | 307—106 |
| 1,989,172 | 1/1935 | Markley | 307—106 |
| 2,057,845 | 10/1936 | Pattee | 324—146 |
| 2,752,791 | 7/1956 | Jarosh et al. | 74—5.6 |
| 2,779,442 | 1/1957 | Bacon | 324—125 |
| 2,882,484 | 4/1959 | Swainson | 323—51 |
| 3,001,124 | 9/1961 | Johnson | 307—106 |

FOREIGN PATENTS

| | | |
|---|---|---|
| 528,303 | 10/1954 | Belgium. |
| 879,408 | 6/1953 | Germany. |

ORIS L. RADER, *Primary Examiner.*

LLOYD McCOLLUM, *Examiner.*